United States Patent Office 3,437,379
Patented Apr. 8, 1969

3,437,379
PROCESS FOR MINING AND REFINING PHOSPHORUS
Maria G. Dunseth, Baltimore, Casimer C. Legal, Jr., Elkridge, and Preston L. Veltman, Severna Park, Md., assignors to W. R. Grace & Co., New York, N.Y., a corporation of Connecticut
No Drawing. Filed Feb. 17, 1967, Ser. No. 616,773
Int. Cl. E21c 41/00, 41/14
U.S. Cl. 299—5    7 Claims

ABSTRACT OF THE DISCLOSURE

A method for mining natural phosphate matrix by flushing the phosphate matrix within an $SO_2$-water solution. The solution is recovered, filtered to remove solid impurities and the phosphate is then removed from the solution by precipitation which is effected by reducing the $SO_2$ content of the solution. The recovered $SO_2$ and liquid phase are recycled to the mining process.

---

This invention relates to mining and refining phosphorus.

It is an object of this invention to provide a new and improved method of mining phosphorus. It is a further object of this invention to provide a new and improved method of refining phosphorus. It is another object of this invention to provide a new and improved method of mining and refining phosphorus.

It is a still further object to provide such a method that is economical in operation and provides products of high purity.

In summary, a natural phosphorus containing matrix is mined and refined by flushing the matrix with the $SO_2$-water solution. The flushing solution dissolves phosphorus in the matrix. The flushing solution containing the dissolved phosphorus is then recovered and treated to reduce the phosphorus holding capacity of the solution. This is done by removing $SO_2$ from the solution. The phosphorus is thereby precipitated. The precipitated phosphorus is then separated from the solution.

By an aspect of the invention the phosphorus containing matrix is simultaneously mined and partially refined in place by flushing the matrix with the $SO_2$-water solution, dissolving the phosphorus in the matrix and recovering the solution containing the dissolved phosphorus from the matrix, leaving a fraction of the matrix in place.

By a further aspect of this invention the phosphorus is removed from the solution in different compositions by fractional precipitation. This is done by fractionally reducing the $SO_2$ content of the solution in stages and separating the precipitate that forms at each stage from the remaining solution.

By a still further aspect of this invention the $SO_2$ removed from the solution and the residual water that has been separated from the precipitated phosphates are recycled to the beginning of the mining phase of this procedure where they are reconstituted by additions, to achieve the desired $SO_2$ concentration, preferably a saturated $SO_2$ solution.

By another aspect of this invention preparation for flushing the phosphorus containing matrix includes inserting at least two concentric pipes into the matrix and the flushing solution moves continuously out of the matrix through the annulus defined by the inner pipe and the next outer pipe.

Phosphorus as used in this application is to be understood to include all of the compounds of phosphorus which may occur in nature as natural minerals and all of the manufactured forms.

In the course of making this invention, a column of natural pebbles of phosphate rock was prepared using pebbles from the Florida mines of W. R. Grace & Co. The column was prepared by pouring the phosphate pebbles into a Pyrex pipe having an inside diameter of 2 inches. The column of pebbles was 24 inches high.

One liter of a 6% $SO_2$ solution was continuously circulated through the column of pebbles at the rate of 50 ml. per minute. The rate of circulation was set by restricting the out-flow at the bottom of the column. A steady head of about 12 cm. was maintained at the top of the column.

After 60 minutes a sample of the sulfurous acid solution was taken and analyzed. The analysis was 1.62% $P_2O_5$, 6% $SO_2$, 2.30 CaO. The CaO to $P_2O_5$ ratio was 1.41. After 240 minutes another sample of the sulfurous acid solution was taken and analyzed. The analysis was 1.92% $P_2O_5$, 6% $SO_2$, 2.95% CaO and the CaO to $P_2O_5$ ratio was 1.53.

In a separate experiment .6814 pound of water, 0.42 pound of $SO_2$ and .0321 pound of ground phosphate rock were introduced into a resin kettle. The resin kettle had an inside diameter of 3½ inches and a height of 6 inches. The phosphate rock was 75 BPL Florida phosphate rock obtained from W. R. Grace & Co. and having a U.S. standard screen size of 100% through 30 mesh and about 60–70% through 200 mesh. The rock analyzed $P_2O_5$ 32.44%, CaO 46.48%, $Fe_2O_3$ 1.08%, $Al_2O_3$ 1.62% and F 3.63%.

The materials were maintained under continuous and vigorous agitation which maintained the ground rock in suspension. Samples were removed periodically and centrifuged to separate out of the suspended solids. The liquid phase was then analyzed. The following samples were taken and analyzed for $P_2O_5$.

| Minutes: | Total $P_2O_5$, percent |
|---|---|
| 60 | 1.27 |
| 120 | 1.33 |
| 180 | 1.43 |
| 220 | 1.39 |
| 300 | 1.47 |
| 360 | 1.46 |
| 420 | 1.44 |

In another experiment 350 cc. of 6% $SO_2$ solution was prepared in a resin kettle of the type previously described and 100 grams of phosphate sand added and the mixture was agitated vigorously for 3 hours. An additional 100 cc. of 6% $SO_2$ solution was added during the 3 hour period in small increments as required to wash the solids from the sides of the kettle when the solids were visually observed to be accumulating upon the kettle's sides. The phosphate sand was obtained from Beaufort County, N.C. The sand analyzed 20.13% $P_2O_5$, 32.02% CaO, 0.71% $Fe_2O_3$, and 2.83% F. After 3 hours the contents of the resin kettle were centrifuged and the liquid phase was then analyzed. The analysis was found to be 2.94% $P_2O_5$ and 3.70% CaO.

Another experiment was conducted under superatmospheric pressure. In this experiment, 750 cc. of water and 200 grams of phosphate sand were placed in a 2 liter, Parr bomb equipped with a Teflon jacket and an agitator. The water was placed in the bomb and the agitator cut on. After this the phosphate sand was added and suspended by the agitation. The Parr bomb was then closed. A separate bomb was filled with $SO_2$ and connected to the Parr bomb. The $SO_2$ filled bomb was heated and $SO_2$ driven into the Parr bomb until a pressure of 70 p.s.i. was attained in the Parr bomb. This supplied 405 grams of $SO_2$ to the Parr bomb which was in excess of $SO_2$ saturation at 70 p.s.i. After 3 hours the contents of the Parr bomb were removed through No. 2 semiquantitative/qualitative Whatman filter paper. The liquid phase was analyzed and found to contain 3.6% $P_2O_5$ and 5.24% CaO.

In another experiment .6841 pound of water, 0.42 pound of $SO_2$ and .0321 pound of the ground phosphate rock previously described were introduced into a resin kettle of the type previously described. The materials were vigorously agitated in the resin kettle for 3 hours. Then the contents of the resin kettle were emptied into a Buckner funnel onto No. 2 semiquantitative/qualitative Whatman filter paper and the solution collected in a filtration flask. The filtrate weighed .7291 pound and analyzed 1.43% $P_2O_5$ and contained .0104 pound of $P_2O_5$ and contained .0104 pound of $P_2O_5$ and .0422 pound of $SO_2$. The insolubles were removed from the filter paper and weighed. They weighed .0022 pound and were found to be predominately $SiO_2$.

The filtrate was placed in a thin film flash evaporator. The flash evaporator had two spherical containers connected together by a neck portion. The filtrate was placed in one container which was rotated in an oil bath maintained between 75 to 80° C. for 40 minutes. Vapor passed through the neck portion of the evaporator and condensed in the other container which was rotated in a stream of cool water. Solids were visually observed to form in the heated container after about 5 minutes. The suspension left in the first heated container after the evaporation treatment was centrifuged to separate out the solids. The solids were found to weigh .0305 pound and contained .01 pound of $P_2O_5$ and analyzed 32.85% $P_2O_5$, 32.83% available (citrate soluble) $P_2O_5$, 34.24% CaO, 1.14% $Al_2O_3$, 0.61% $Fe_2O_3$ and 6.91% $SO_4$. The liquid weighed .4967 pound and contained .0045 pound CaO, .0092 pound $SO_2$. The phosphorus analysis was about .1% $P_2O_5$. The condensate contained .1703 pound water and .0316 pound of $SO_2$. The flash evaporator was operated at a vacuum of 65 mm. of Hg.

.7291 pound of additional phosphorus containing $SO_2$ solution was prepared substantially as in the last described procedure. This phosphorus containing $SO_2$ solution analyzed 1.43% $P_2O_5$. This solution was subjected to fractional evaporation. In the first evaporation stage, which was conducted substantially as previously described, but for only a 10 minute period .0254 pound of $SO_2$ was removed and 5% of the water which was .034 pound. This reduced the $SO_2$ concentration from 6% to about 2.6%. The 2.6% $SO_2$ solution was then subjected to centrifugation and the solids and liquids were separated. The solids were found to contain 24% fluorine and 23.78% $P_2O_5$ and 23.75% available $P_2O_5$. The liquid was found to contain 2.6% $SO_2$.

The 2.6% $SO_2$ solution was then subjected to evaporation and .0062 pound of $SO_2$ was removed. This reduced the $SO_2$ concentration from 2.6% to about 1.8%. The 1.8% $SO_2$ solution was then subjected to centrifugation and the solids and liquids were separated. The solids were found to analyze 34.27% $P_2O_5$ and 34.25% available $P_2O_5$. No fluorine was detected in the solids. The liquid was found to contain approximately 0.1% $P_2O_5$.

The last set out procedure was repeated except the evaporation period was only 5 minutes. The solids were collected and analyzed. The total $P_2O_5$ was found to be 12.6%, the available $P_2O_5$ 12.1%, CaO 32.8%, and the fluorine 30.0%.

By this invention phosphorus is mined by flushing an $SO_2$-water solution through a naturally occuring phosphate containing matrix. This can be applied to both naturally occuring hard phosphate rocks and naturally occuring sand and pebble matrixes.

In preferred embodiments, in hard rock it is necessary to fracture the rock if there is not sufficient natural porosity. By this technique, in its conventional application as employed here, a hole is drilled into the phosphate containing matrix and an explosive charge is introduced into the matrix through the hole. The explosive is detonated and a fractured pocket is formed in the hard phosphate matrix. Three concentric pipes are inserted into the pocket and the $SO_2$-water flushing solution is forced into the fracture through the annulus defined by the outer pipe and the second pipe. After a sufficient period of time has been allowed to enable the substantial phosphate saturation of the flushing water, the solution is recovered through the annulus defined by the inner pipe and the second pipe by feeding $SO_2$ gas or a substantially inert gas down the inner pipe to provide the pressure to force the solution from the fracture pocket.

In the sand type matrixes chemical grouting is used to isolate an area of the matrix. This is done in a conventional manner by drilling holes at spaced intervals around the area to be isolated. The holes are drilled at spaces of about 5 feet, the spacing varying as required to permit the interconnection of the grouting forced into the holes. The grouting should be anchored to an underlying impervious formation where possible. After the selected area has been encompassed the concentric pipe is inserted into the area of the phosphate containing matrix. The outer pipe usually terminates in an upper region of the phosphate containing matrix. The inside two pipes extend further down in the matrix so that the flushing solution can be recovered as it perculates downwardly in the martix. The inside two pipes may even be lowered as mining progresses.

The $SO_2$-water flushing solution is pumped into the upper region of the matrix through the annulus defined by the inner pipe and the second pipe. After a sufficient period of time has been allowed to enable the substantial phosphate saturation of the flushing water, the water is recovered through the annulus defined by the inner pipe and the second pipe by feeding $SO_2$ gas or a substantially inert gas down the inner pipe to provide the moving force to move the flushing solution to the surface.

Alternatively, in special situations where artesian water is available to the phosphate matrix, $SO_2$ may be pumped into a lower region of the matrix and the water allowed to rise naturally in the matrix forming an $SO_2$-water solution in situ. In some regions of Beaufort County, N.C. only a penetration of an underlying limestone rock is necessary to make the artesian water available to the phosphate matrix. An outer concentric pipe may be provided around the pipe feeding the $SO_2$ into the ground. This outer pipe would terminate some distance above the inner $SO_2$ feeding pipe and provide a channel for the outflow of the artesian, $SO_2$-water solution. This outer pipe might be adjustable so that it could be raised as mining progressed.

The flushing solution usually requires from 10 minutes to 180 minutes in the phosphate matrix for phosphate saturation on the first flushing sequence. The $SO_2$-water flushing solution dissolves the phosphorus in the matrix in situ and leaves much of the undesired impurities, such as silicon oxide, behind.

It is usually preferred that the sulfurous acid solution used for solubilizing the phosphorus in the matrix be saturated with $SO_2$. At atmospheric pressure water is saturated with $SO_2$ at about 6% $SO_2$. It is a rule of thumb that 1 p.s.i.g. per foot is needed to force water into a natural matrix through the outer annulus of the concentric pipe. Thus, if the matrix lies a substantial distance underground and the flushing solution must be forced down, for example, 70 feet we would have 70 p.s.i. of pressure above atmospheric pressure and more $SO_2$ could be added before the water would be saturated with $SO_2$. The more $SO_2$ concentrated the solution, the greater is its phosphate holding capacity before phosphate saturation.

The maximum $SO_2$ concentration that can be obtained in solution in water is 18%. This concentration is obtained at 48 p.s.i.g. at about 25° C. Beyond this $SO_2$ concentration $SO_2$ and water remain as separate phases even with increased pressure.

A 6% $SO_2$-water solution will hold aobut 1.9 to 2.9% $P_2O_5$ at atmospheric pressure along with the usual impurities soluble in an $SO_2$-water solution that are inherent in a natural phosphate matrix. The soluble impurities function in the system to restrict the solubility of phosphorus. Aluminum, iron, manganese, calcium and fluorine constitute only a partial list of the impurities present in natural phosphate matrix in substantial quantities that are soluble in an $SO_2$-water solution.

An $SO_2$-water solution containing at least about 5.5 to 6.5%, more preferably substantially above 6.5% $SO_2$, is used to flush the natural matrix and the solution is maintained in contact with the phosphate matrix for about 10–180 minutes until the solution becomes substantially phosphorus saturated under the conditions existent, i.e. the various impurities present in the matrix that are soluble in an $SO_2$-water solution. After the solution is substantially phosphorus saturated it is recovered. If the $SO_2$ solution has been under pressure and the $SO_2$ content is above the 5.5 to 6.5% level when the solution is recovered, the $SO_2$ content is usually reduced to about 5.5 to 6.5% more usually 6%, $SO_2$ by reduction to atmospheric pressure. A precipitate forms and a new equilibrium of solubilities is reached. The solid precipitate may be removed at this point or $SO_2$ reduction may be continued until a lower $SO_2$ concentration is obtained.

When the $SO_2$ content is about 5.5 to 6.5% $SO_2$, the solution usually contains about 1.9–2.9% $P_2O_5$ more usually about 2% $P_2O_5$ and 1–1.5% impurities, more usually 1.1% impurities. The $P_2O_5$ to impurities ratio would be above 1.26. Sulfur and water are not counted as impurities in the liquid phase. They are counted as solubilizing agents. In the solid precipitate, everything except phosphorus is considered an impurity. An analysis of the impurities shows they contain about 1.50–3.50% CaO, .001–.1% $Al_2O_3$, .1–.3% $Fe_2O_3$ and .2–.4% F, usually about 2.02% CaO, .001% $Al_2O_3$, .13% $Fe_2O_3$ nad .20% F.

When the $SO_2$ concentration is reduced from about 6% to about 3.5% the solution yields a solid containing about 12.6% $P_2O_5$, 12.1% available $P_2O_5$ 32.8% CaO and 30.0% fluorine.

It is preferable, however, to reduce the $SO_2$ concentration directly from the 5.5 plus level to 2.5–3.9% $SO_2$, more preferably about 2.6%. This produces a precipitate that can generally be described as dicalcium phosphate with a high calcium fluoride content. Substantially all of the fluorine is precipitated at the 2.5–3.9% $SO_2$ level, usually by the preferred 2.6% $SO_2$ level.

About 20% of the phosphorus contained in the solution on a 5.5–6.5% $SO_2$ concentration basis is precipitated when the $SO_2$ content is reduced to 2.5–3.9 and usually to the 2.6% level. When the solid precipitate is separated from the liquid phase the solid precipitate has a 12 to 24% $P_2O_5$ content which is about 5–10% P and a 15–30% F. content. The $P_2O_5$ content is usually about 23% and the F. content 17%. In addition the precipitate contains about 32–35° CaO, 5–7% $Al_2O_3$, .4–.9% $Fe_2O_3$. Usually the precipitate contains about 33% CaO, 6% $Al_2O_3$, and .6% $Fe_2O_3$ and about 90–95% total impurities, usually 90% total impurities.

The $SO_2$ content of the liquid phase is then reduced from 2.5–3.9% to about 1.8–1%, preferably about 1.5%. This removes about 75% of the $SO_2$ and about 95–98% of the phosphorus from the solution on a 5.5–6.5% $SO_2$ basis. The solid precipitate that forms is separated from the liquid phase. The precipitate can generally be described as dicalcium phosphate almost entirely free of fluorine. This material is a high grade phosphorus material that is about 32–35% $P_2O_5$, which is about 14–15% P, usually about 32% $P_2O_5$ which is about 14% P or 39% $P_2O_5$ when dehydrated at 200° C. for 3 hours. In addition the precipitate contains about 32–35% CaO, .1–1.3% $Al_2O_3$, .4–.8% $Fe_2O_2$, 5–9% $SO_4$. Usually the precipitate contains about 33% CaO, 0.1% $Al_2O_3$, 0.4% $Fe_2O_3$ and 7% $SO_4$ and about 85–86% of the precipitate is impurity, usually about 86% is impurity. The F content is usually so slight that is cannot be detected by the standard AOAC technique.

The residual liquid phase remaining contains about .1–.3% $P_2O_5$, .5–9 CaO, and 1.8–1% $SO_2$, usually about .2% $P_2O_5$, .7% CaO, and 1.4% $SO_2$, and the $Al_2O_3$, F and $Fe_2O_3$ levels are usually so slight as to be undetectable by standard AOAC techniques. The total impurities constitute about .35 to .7% of the residual liquid, more usually about .5%.

This residual liquid may be recycled to the beginning of the mining phase of this invention. The $SO_2$ and the small amount of water removed with it by evaporation or vaporization may also be recycled. The $SO_2$ concentration of the recycled materials should be adjusted to the desired concentration optimally a water solution saturated with $SO_2$. This entire operation can be a continuous operation where the natural matrix solubility and permability characteristics permit.

What is claimed is:

1. A method for mining and refining a naturally occurring phosphorus containing matrix comprising flushing said matrix with an $SO_2$ solution to dissolve the phosphorus in said matrix, recovering said solution containing the dissolved phosphorus, filtering the recovered solution to remove solid impurities, precipitating the dissolved phosphorus from the solution by reducing the $SO_2$ content of the said solution and recycling the removed $SO_2$ and liquid phase to the said matrix.

2. The method according to claim 1 wherein the $SO_2$ solution used to flush the matrix is substantially saturated with $SO_2$ and wherein a substantial amount of fluorine is dissolved as an impurity with the desired phosphate and wherein the $SO_2$ content of said solution is reduced to about 2.5–3.9% $SO_2$ and substantially all of the fluorine in the solution is precipitated, the solid phase is separated from the liquid phase of the solution, and the $SO_2$ content of the liquid phase is reduced to about 1.8–1% $SO_2$ and a substantially fluorine free phosphate material is precipitated.

3. The method of claim 1 wherein said recovered solution contains about 1.9–2.9% $P_2O_5$ and about 1–1.5% impurities when the $SO_2$ content is between about 5.5–6.5% $SO_2$, the impurities including significant amounts of Ca, Al, Fe and F and wherein the $SO_2$ content is reduced from above 5.5% $SO_2$ to about 2.5–3.9% $SO_2$ and a solid precipitate is formed; the solid precipitate is separated from the liquid phase and the solid precipitate contains about 12–24% $P_2O_5$ and about 90–95% impurities including significant amounts of Ca, Al, Fe and F; and the $SO_2$ content of the liquid phase is reduced to about 1.8–1% $SO_2$ and another solid precipitate is formed; said other solid precipitate is separated from the second liquid phase and said other solid precipitate contains about 32–35% $P_2O_5$ and about 85–86% impurities including significant amounts of Ca. Al, Fe and S and the liquid phase contains about .1–.3% $P_2O_5$ and about .35–7% impurities including a significant amount of Ca and about 1.8–1% $SO_2$.

4. A method of mining and refining a naturally occurring phosphorus containing matrix comprising drilling a hole into the matrix, introducing an explosive charge into the matrix through said hole, detonating the explosive and forming a fracture pocket in the said matrix and inserting three concentric pipes into the matrix, flushing said matrix with an $SO_2$ solution by forcing said $SO_2$ solution into the fracture through the annulus defined by the outer pipe and the second pipe, and recovering the flushing solution containing the dissolved phosphorus by feeding $SO_2$ gas down the center pipe to force the flushing solution out of the fracture through the annulus defined by the inner pipe and the second pipe.

5. The method of claim 4 wherein said recovered solution contains about 1.9–2.9% $P_2O_5$ and about 1.50–3.50% CaO, .001–.1% $Al_2O_3$, .1–.3% $Fe_2O_3$ and .2–.4% F when the $SO_2$ content is between about 5.5–6.5% $SO_2$; when the $SO_2$ content is reduced to about 2.5–3.9% $SO_2$ a solid precipitate is formed containing about 12–24% $P_2O_5$, and about 32–35% CaO, 5–7% $Al_2O_3$, 4–9% $Fe_2O_3$ and 15–30% F; and when the $SO_2$ content of the liquid phase is reduced to about 1.8–1% $SO_2$ and another solid precipitate is formed said other precipitate contains about 32–35% $P_2O_5$ and about 32–35% CaO, 1–3% $Al_2O_3$, 4–8% $Fe_2O_3$, and 5–9% $SO_4$ and the solution remaining contains about 1–3% $P_2O_5$, and .5–.9% CaO, and 1.8–1% $SO_2$.

6. The method of claim 4 wherein preparation for flushing the phosphorus containing matrix includes enclosing an area of phosphate matrix with grout, inserting three concentric pipes into the matrix, positioning the outer pipe to terminate near the top of the matrix, positioning the inner two pipes to terminate at a lower level in the matrix than the outer pipes and wherein said flushing solution is forced into the matrix through the annulus defined by the outer pipe and the second pipe, said flushing solution percolating down in the matrix and being recovered by feeding $SO_2$ gas down the center pipe, the flushing solution moving out of the matrix through the annulus defined by the inner pipe and the second pipe.

7. A method of mining and refining a naturally occurring phosphorus containing matrix comprising inserting two concentric pipes into the matrix, feeding $SO_2$ gas down the center pipe, tapping artesian water which flows upwardly forming a solution with the $SO_2$ gas, whereby the $SO_2$ solution is formed in situ within the matrix and is recovered through the annulus defined by the inner pipe and the outer pipe.

References Cited

UNITED STATES PATENTS

| | | | |
|---|---|---|---|
| 2,954,287 | 9/1960 | Carothers et al. | 23—165 X |
| 3,278,233 | 10/1966 | Hurd et al. | 299—4 |
| 3,359,037 | 12/1967 | Every et al. | 299—4 |

ERNEST R. PURSER, *Primary Examiner.*

U.S. Cl. X.R.

23—165, 312